UNITED STATES PATENT OFFICE.

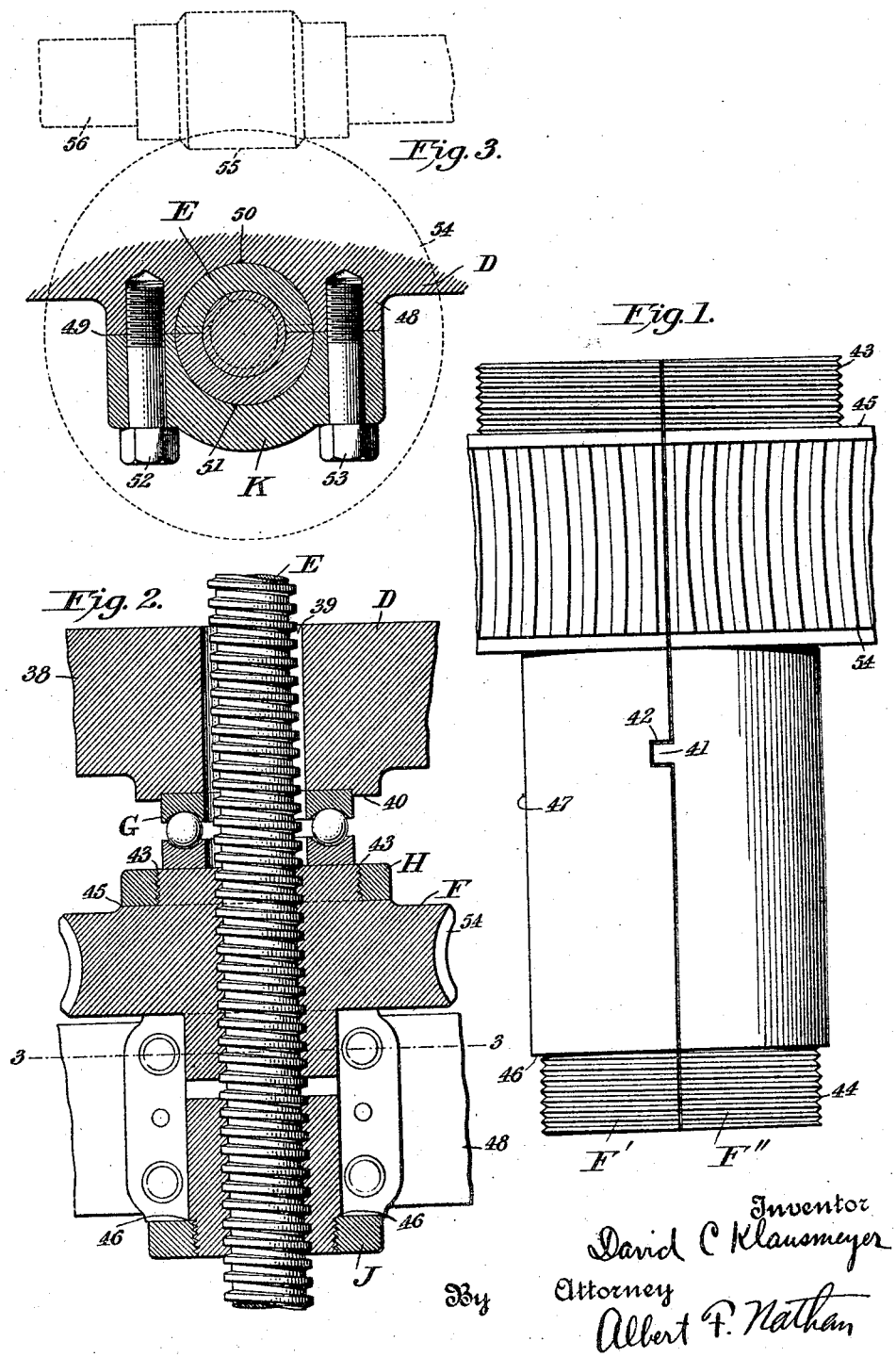

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

ROTARY SECTIONAL INSPECTIVE NUT.

1,419,906.  Specification of Letters Patent.  Patented June 13, 1922.

Original application filed July 8, 1921, Serial No. 483,231. Divided and this application filed November 26, 1921. Serial No. 518,035.

*To all whom it may concern:*

Be it known that I, DAVID C. KLAUSMEYER, a citizen of the United States, and residing at Cincinnati, in the county of Hamilton and State of Ohio, have invented a new and Improved Rotary Sectional Inspective Nut, of which the following specification is a full disclosure.

This invention relates to safety devices and it is directed more especially to apparatus wherein a relatively heavy and ponderous member is elevated through the agency of a rotary nut and fixed screw; this case being a division of my copending case No. 483,231, filed July 8, 1921.

By reason of the fact that a nut is necessarily quite short in length while the screw is much longer, it follows that the wear is capable of being distributed over a much greater length of thread, and consequently is proportionately less destructive, in the case of a screw than in the case of a nut. Furthermore, since the threads of a nut are internal, the wear on them is not ordinarily capable of being readily seen and therefore the threads may easily become worn to the point of stripping without being brought to the attention of the user. Furthermore, the nature of the nut, and the necessities incidental to its proper mounting, has led to the conventional practice of locating the nut in a comparatively inaccessible region; it being usually imbedded in the part that it is arranged to elevate. In the case in hand the nut is rotatably mounted and is arranged in a socket in the heavy ponderous radial arm which it is designed to elevate by co-operating with the fixed lifting screw.

On account of the fact that the rotary nut receives a preponderating proportion of the wear, and inasmuch as such wear is not immediately apparent and cannot be ascertained without disassembling the parts, there is considerable danger that its threads will be weakened by wear to the point of stripping under the weight of the arm or other frame-element of the machine in which it is embodied. In that event, there would be nothing to prevent the arm from falling of its own weight; to the damage of the machine and to the injury of any person in its path.

This invention proposes an improvement in the construction of the rotary nut whereby it may very easily, and without in anywise disturbing the mounting of the fixed screw or other assembled elements of the machine, be inspected for the purpose of determining the condition of its threads, and thereby enable the user to ascertain whether it is safe to continue the use of the nut or whether it should be replaced by a new one.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figs. 1 to 3 show the application of this invention to a rotatable nut; Fig. 1 being an elevation of the isolated nut, Fig. 2 being a vertical section of its arrangement in a machine, and Fig. 3 being a section through line 3—3 of Fig. 2.

The modification depicted by Figs. 1 to 3 may be resorted to whenever a rotatable nut is employed. It is for instance quite usual to effect the elevation of the arm of a radial drill by means of a nut journalled in and bodily movable with said arm; said nut being rotated by means of a suitable transmission leading to the prime-mover. It is quite difficult to get access to the nut in such constructions and the replacement of the nut involves a de-mounting of the lifting screw and is, in other respects, a very vexatious undertaking. Furthermore, it is quite impossible in such constructions to inspect the threads of the nut inasmuch as rotatable nuts are invariably made of one piece.

The characteristics of this invention admit of being very neatly and effectively utilized for imparting the safety features to rotatable nuts and, as an example of such utilizations, reference is made to the drawings. In this modification, D represents a portion of the arm of a radial drill. This arm is preferably so fashioned as to provide a portion 38 which is apertured, as indicated by 39, to provide for the passage of a non-rotatable lifting-screw E. The portion 38 integrally circumscribes the arm and provides an annular seat 40 adapted to rest upon a nut which, by reason of its threads, is supported by the screw. The nut is indicated by F and preferably a ball-thrust-bearing G is interposed between the seat 40 and the nut so as to reduce the friction of the thrust occasioned by the weight of the arm D. In accordance with this invention, the nut F is sectional in form; being so constituted that one of the sections may be independently withdrawn to permit of inspection without disturbing the thread engagement between the screw and the remaining portion of the nut. Should it not be desired to utilize also the capacity of demountability, the removable section may be relatively small and in the nature, so to speak, of a sample of the nut but, inasmuch as the ability to demount the entire nut is a matter of no little consequence, it is desirable to have all of the sections of the nut successively demountable. In the construction illustrated, provision is made for enabling the user very readily to remove one section and then to replace it and then remove the other section, or to remove the sections successively, in which latter case the arm will be independently supported by a jack. As shown by Fig. 1, the nut consists of two sections F' and F''. These sections are divided by a diametrical plane so that each may be freely removed from the screw, and these sections are held accurately against longitudinal replacement by means of a radial tongue 41 interfitting with a counterpart slot 42. In order to hold these sections against spreading, they are threaded at their respective ends as indicated by 43 and 44 and suitable collars H and J are screwed on to these threaded ends and brought tightly against shoulders 45 and 46 provided by the sectional nut. The sections provide a smooth cylindrical portion 47 in the nature of a journal and this journal is normally arranged in a two-part bearing located on the underlying portion of the arm and admits of free access. To that end, such portion of the arm provides a box 48 which terminates in a flat plane 49 coincident with the axis of the screw; said boss providing a semi-circular seat 50 adapted to receive one-half of the journal-like portion 47 of the nut. A cap K likewise provides a semi-circular seat 51 which receives the other half of the journal. This cap is, by means of the bolts 52 and 53 normally held in place as shown by Fig. 3 but admits of being very easily detached to expose one-half of the journal 47 of the nut. The nut is driven by a worm-wheel 54 normally meshing with a worm 55 mounted on a shaft 56 suitably journalled in or on the arm.

Should it be desired to inspect one of the sections of the nut, the collar H will be screwed off of the end 43; it being noted that the ball-bearing G is smaller in diameter than the threaded end 43 of the nut so as to permit the collar to be moved upwardly to encircle the ball-bearing and entirely clear the nut. Likewise, the collar J is unscrewed from the other end of the nut and the cap K is unbolted and removed. Now, by rotating the shaft 56 until the split in the nut coincides with the plane 49, one of the sections of the nut will be entirely free and may be removed; the other section being, however, held in place by reason of intervening between the seat 50 and the screw so that any inadvertent fall of the arm will be guarded against. The removed section may now easily be replaced and, by turning the shaft 56, the sectional nut will be rotated as a unit until the other section is brought into its releasable position, whereupon it may likewise be removed and inspected. Should it be desired to entirely replace the nut, the arm will first be jacked up and the sections of the old nut will be removed in succession and the sections of the new nut will be inserted in succession and the collars and the cap will be replaced and the organization will then be ready for further use.

It will be seen that this construction is simple in arrangement and effective for the purposes indicated.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A machine-tool combining an upwardly moveable frame-element; a fixed lifting-screw therefor; a rotary nut operating in conjunction with said screw, said nut being constructed of two separable sections; and means for preventing the one section from being withdrawn from said screw without first locking the other section against withdrawal.

2. A safety elevating-mechanism combining a member to be lifted; a two-part rotary nut axially split and mounted in said member so as to be restrained against axial movement relative thereto; a fixed screw threaded through the bore of said two-part nut; and means for permitting either of the sections of said nut to be swung clear of said screw, said means being adapted to lock both of said sections in place and to release only one of said sections at a time.

3. An organization of the nature disclosed combining an arm; a fixed screw; and a rotary nut, said nut comprising sections and adapted to be bodily removed without demounting said screw.

4. A radial drill comprising, in combination, an arm adapted to be elevated; a rotary nut and fixed screw arranging to effect an elevation of said arm, one of said elements being mounted to sustain the thrust and the other being arranged to engage said arm, said rotary nut being constructed in sections and adapted to be entirely demounted without removing said screw, whereby said nut may expeditiously be replaced by a new nut.

5. A machine-tool combining a relatively stationary frame-element; an upwardly moveable frame-element; and a rotary nut and a fixed screw intervening between said elements to effect an elevation of the movable element, said rotary nut being constructed in two sections each being independently removeable; and means for normally retaining said sections together.

6. A radial drill combining an arm adapted to be elevated, said arm being provided with a laterally open socket; a fixed lifting-screw extending vertically through said socket; a rotary nut normally located in said socket against endwise movement, said nut comprising sections in threaded engagement with said screw and adapted to be bodily removed from such socket for purposes of replacement without disassembling said screw; and means for normally retaining said sections in unitary relation.

7. A radial drill combining an arm having a socket; a fixed screw extending vertically through said socket; and a sectional rotary nut mounted in said socket with its sections normally maintained in threaded engagement with said screw, the parts being constructed and arranged so that each of said sections may be removed and replaced without disassembling either the arm or the screw.

8. A radial drill combining an arm adapted to be elevated and having a socket; a fixed lifting-screw extending vertically through said socket; a sectional rotary nut contained in such socket; and means for normally locking the sections of said nut against bodily removal, said means being adapted to be operated to afford a temporary disengagement of one of said sections from such screw, whereby the condition of its threads may be ascertained.

9. An elevating mechanism combining a frame-element; a fixed lifting-screw; a rotary nut demountably journaled in said frame-element, said nut being composed of sections; and means for normally holding said sections against separation and adapted to permit them to be demounted from said screw without disturbing the mounting of said screw.

10. An elevating mechanism combining a non-rotatable screw; a rotary nut composed of two half-sections; means for normally holding said sections against separation; means for rotating said nut; and a frame-element providing an accessible bearing for said nut, said bearing being so formed and located as to permit the sections of the nut to be demounted without disturbing said screw.

11. A machine tool combining a bodily-movable member; a fixed screw; and a rotary element threaded thereto and co-operating to shift said member, said rotary element including a part detachably mounted in a fixed relation therewith and having a portion normally maintained in threaded relation with said screw so as to wear at a rate proportionate to the wear of the remaining part of said rotary element and thereby serve as an indicator of the condition of said rotary element.

12. A device of the nature disclosed combining a fixed screw; and a rotary member having a threaded connection therewith and adapted to be elevated thereby; including a part mounted to move as a unit with said member and having a portion normally held in threaded relation with said screw and adapted to be readily disengaged to display the wear occasioned by said screw.

13. A wear-exhibiting instrumentality comprising a member; a fixed screw and a rotary element threaded thereto arranged to be relatively rotated to elevate said member, said element including an auxiliary part mounted to rotate with said element so as to be movable in unitary relation therewith, said part providing an arcuate face in threaded engagement with said screw and adapted readily to be detached from said screw to afford an inspection of its arcuate face to enable the extent of wear of the threads of said part to be ascertained.

14. A radial-drill combining an arm; a fixed lifting screw therefor; and a nut rotatably mounted on said arm in engagement with said screw; said nut including a detachable part mounted in unitary relation with the remaining part of said nut to be immovable relatively thereto, said part having a face partially encircling said screw and threaded thereto so as to wear at a rate equal to the wear of the said remaining part.

In witness whereof, I hereunto subscribe my name, as attested by the two subscribing witnesses.

DAVID C. KLAUSMEYER.

Witnesses:
C. C. SLETE,
META NORDMAN.